United States Patent [19]

Ecklin

[11] Patent Number: 4,567,407
[45] Date of Patent: Jan. 28, 1986

[54] BIASED UNITIZED MOTOR ALTERNATOR WITH STATIONARY ARMATURE AND FIELD

[76] Inventor: John W. Ecklin, 6143K Edsall Rd., Alexandria, Va. 22304

[21] Appl. No.: 392,102

[22] Filed: Jun. 25, 1982

[51] Int. Cl.<sup>4</sup> .................... H02P 7/66; H02K 47/04
[52] U.S. Cl. ......................... 318/140; 318/138; 318/149; 318/153; 310/113; 310/155
[58] Field of Search ............ 318/140, 141, 142, 144, 318/148, 149, 151, 152, 153, 138; 310/159, 102 R, 103, 113, 158, 159, 152, 154, 156, 168, 171, 177, 179, 46, 181, 155; 322/39, 90, 100, 13

[56] References Cited

U.S. PATENT DOCUMENTS

| | | | |
|---|---|---|---|
| 1,730,340 | 10/1929 | Smith | 322/27 |
| 2,217,499 | 10/1940 | Smith | 322/27 X |
| 2,279,690 | 4/1942 | Lindsey | 310/46 |
| 2,505,130 | 4/1950 | Maynard | 310/155 |
| 2,520,828 | 8/1950 | Bertschi | 310/155 |
| 2,732,509 | 1/1956 | Hammerstrom et al. | 310/168 |
| 2,816,240 | 12/1957 | Zimmer | 310/181 X |
| 3,009,092 | 11/1961 | Carmichael | 322/17 X |
| 3,010,040 | 11/1961 | Braun | 310/181 X |
| 3,253,170 | 5/1966 | Philips et al. | 310/168 |
| 3,346,749 | 10/1967 | Shafranek | 310/181 X |
| 3,512,026 | 5/1970 | Tiltins | 310/168 |
| 3,518,473 | 6/1970 | Nordebo | 310/168 |
| 3,569,804 | 3/1971 | Studer | 318/138 |
| 3,577,002 | 5/1971 | Hall | 310/240 X |
| 3,588,559 | 6/1971 | Fono | 310/168 |
| 3,594,595 | 6/1971 | Frederic et al. | 310/168 |
| 3,641,376 | 2/1972 | Livingston | 310/113 |
| 3,879,622 | 4/1975 | Ecklin | 310/80 |
| 3,953,753 | 4/1976 | Barrett | 310/168 |
| 3,967,200 | 6/1976 | Tetsugu et al. | 310/113 X |
| 4,053,801 | 10/1977 | Ray et al. | 310/261 X |
| 4,138,629 | 2/1979 | Miller et al. | 318/140 |
| 4,237,395 | 12/1980 | Loudermilk | 310/113 |
| 4,259,604 | 3/1981 | Aoki | 310/113 |
| 4,297,604 | 10/1981 | Tawse | 310/168 |

Primary Examiner—William M. Shoop, Jr.
Assistant Examiner—Shik Luen Paul Ip
Attorney, Agent, or Firm—Jim Zegeer

[57] ABSTRACT

A unitized (single unit) motor and flux switch alternator having stationary field, armature and motor windings which provides a magnetic path for some of the motor input power to feed through and increase the alternating current (AC) generator output. A rotor formed from a material having a high magnetic permeability (solid or laminated soft steel) is controlled in speed by controlling the magnitude and timing of the pulsed direct current (DC) supplied to the motor windings which may be wound on the stationary legs or the rotor. The current flow in the motor windings can be controlled by a mechanical commutator if the motor windings are on the rotor or by a solid-state converter if the motor windings are on the legs in a manner normally associated with brushless DC motors. The DC windings of the flux switch alternator can be replaced by permanent magnets since the reversing field in the AC output windings are predominantly time stationary.

8 Claims, 7 Drawing Figures

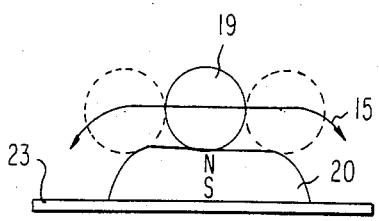
FIG. 1
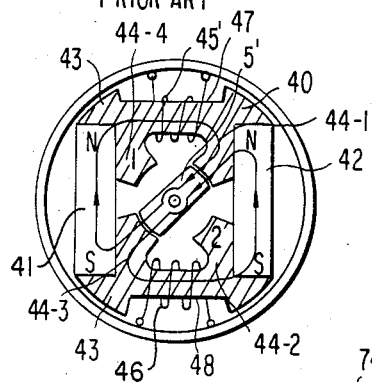
FIG. 2 PRIOR ART
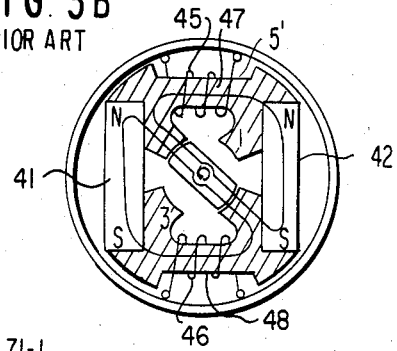
FIG. 3A PRIOR ART
FIG. 3B PRIOR ART
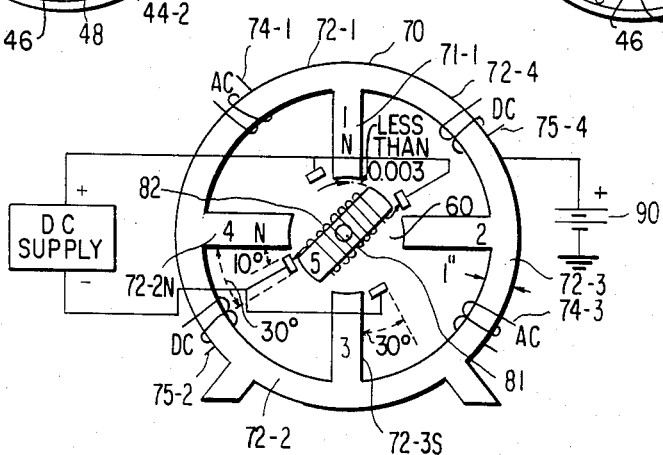
FIG. 4
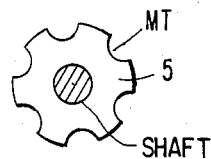
FIG. 5
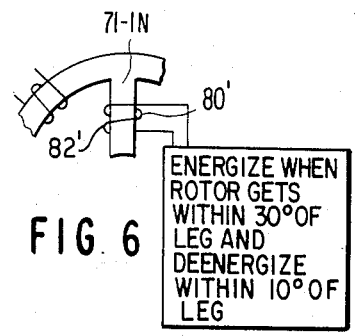
FIG. 6

BIASED UNITIZED MOTOR ALTERNATOR WITH STATIONARY ARMATURE AND FIELD

BACKGROUND OF THE INVENTION

Inductor alternators were as popular and efficient as any generator before 1900. They had no brushes for high reliability but they were slightly larger than other generators and output unidirectional pulses. As a result they lost out to other generators except in special applications. Later the flux switch alternator replaced the inductor alternator as the flux switch alternator outputs AC and since all AC coils and DC coils were used twice as much, the flux switch alternator output four times more than inductor alternator, all else being equal.

Simple inductor alternators had four legs with AC and DC coils wound on each leg and a four lobed steel rotor. The flux switch alternator simply wound these same coils between the four legs instead of on the legs and cut two opposite lobes from the steel rotor. Since only steel rotates with a conservative force, what could require four times more input torque to the flux switch alternator?

Because of sags, glitches, brownouts, blackouts and other surprises from electric power systems many large electronic systems including computers now use a motorgenerator (M-G) for back-up or emergency power. Few motors or generators are individually over 95 per cent efficient so when their shafts are mechanically coupled, the overall efficiency of an M-G with separate motors and generators is seldom over 90 percent efficient.

It is commonplace to teach the output of a generator is equal to the mechanical input power minus the losses. It is also known from Lenz's law (but seldom taught) a generator that is 95 percent efficient consumes 95 percent of the input to overcome torque due to internal forces and 5 percent goes to losses. The rotors of most of today's generators are repelled as they approach a stator and are attracted back by the stator as soon as the rotor passes the stator in accordance with Lenz's law. Thus, most rotors face constant nonconservative work forces and therefore, present generators require constant input torque.

Therefore, it is an object of this invention to provide a more compact motor generator.

It is also an objective of this invention to bias all steel above ground by attaching this steel to the positive terminal of a power supply or battery and grounding the negative terminal to bleed off or gound most free electrons to decrease losses from unwanted induced currents. This will also decrease losses in any other motor, generator or transformer with armatures.

It is further an objective of this invention to make a more compact and far more efficient motor generator by unitization.

It is yet another objective of this invention to take advantage of a conservative no work force demonstrated by a simple damped oscillator consisting of a steel ball bearing released off center on a button permanent magnet with magnetic poles on the flat surfaces.

According to this invention, the legs or the rotor of a flux switch alternator are provided with motor windings. The steel rotor of the unitized flux switch alternator actually aids the input torgue for half of each rotation as the rotor is always attracted and never repelled. This construction makes it possible for some of the current or power fed to the motor windings to magnetically feed through a solid magnetic path to the AC output windings which does not occur in today's M-Gs as they are only mechanically coupled by their shafts and have no common magnetic path to share.

From basic electronic technology we learn a charged condensor has few free or conduction electrons on the positive plate and an excess of free electrons on the negative or grounded plate. Since steel armatures are conductors, there has been considerable effort expended in materials research to increase resistance to conduction electrons in armature materials to thereby reduce hysteresis and eddy current damping losses. Another more common approach is to laminate or powder these armatures. Accordingly, a further feature of the invention, the reduction in hysteresis and eddy current damping losses.

This invention provides a biased and unitized M-G which is smaller, has less loss, and is more efficient than present units.

Since the steel rotor is always attracted to the strongest magnetic field regardless of it's polarity, steel gets a conservative force or is accelerated to a leg and slowed down or decelerated by the magnetic field set up in the legs by the DC coils or permanent magnets of the flux switch alternator. Moreover, because the flux induced into the two lobed rotor by the stationary source of field flux exhibits no reluctance change as rotation takes place, there is an essentially lossless transfer.

Well established mechanical or solid-state commutator technology allows the pulsing or energizing of the motor coils (whether stationary on the legs or on the rotor) to selectively provide given magnetic polarities when the rotor gets within 30 degrees of any leg in the direction of motion of the rotor and to deenergize these pulses 10 degrees or so before the rotor gets to a leg to take advantage of a large collapsing field.

SUMMARY OF THE INVENTION

In accordance with a principle of this invention, a unitized flux switch alternator is provided whose stationary field of flux is established by DC coils or permanent magnets.

In accordance with another principle of this invention, a solid or laminated steel rotor is turned and timed by pulses of current fed to either stationary motor coils on the legs or to a winding on the rotor to increase given magnetic polarities using standard commutating procedures. This pulsed polarized magnetic motor flux feeds through to the AC output coils providing a fatter appearing sine wave for an increased output power.

It will also be appreciated from the foregoing description that the invention is electrically, magnetically and mechanically inexpensive and uncomplicated using only well known and fully developed technologies.

BRIEF DESCRIPTION OF THE DRAWINGS

The foregoing objects and other attendant advantages and features of this invention will become more readily appreciated as the same becomes better understood by reference to the following detailed description when taken in conjunction with the accompanying drawings wherein:

FIG. 1 is a magnetic circuit diagram illustrating the basic embodiment of the invention of how steel moves with conservative forces in a magnet's field, FIG. 2 is a simple prior art inductor alternator, FIG. 3 is a simple prior art flux switch alternator using permanent magnets and demonstrating how magnetic flux is reversed in the AC coils by turning the steel rotor, FIG. 4 is an end view of the unitized, motor generator incorporating the present invention, FIG. 5 illustrates a rotor for a 6 pole unitized MG, and FIG. 6 illustrates a modification wherein the DC motor windings are on the armature pole pieces.

DESCRIPTION OF THE PREFERRED EMBODIMENTS

FIG. 1 is a magnetic circuit diagram which is useful for illustrating a basic aspect of the invention. A steel ball 19 is set on either the North or South pole of a button magnet 20 which, in turn, is positioned on a steel sheet 23. Magnet 20 might be one half inch in diameter by three sixteenths of an inch thick in which case steel ball member 19 should be five sixteenths of an inch in diameter. When steel ball 19 is pushed to the edge of button magnet 20 and released under the influence of the magnetic field, it has a damped oscillation. If all losses could be overcome, the excursion of steel ball 19 would be constant and in either case demonstrates a conservative no work force.

FIG. 2 is a prior art inductor alternator and is shown because such sketches are now difficult to locate and also to observe the similarity of the motion of the steel rotor 13 and 19 in FIG. 1. Stator 10 is provided with pole pieces 11 corresponding in number to the teeth projections 12 on toothed iron rotor 13. Primary winding 14 on pole pieces 11 are energized through rheostat 15 from battery 16 and the AC output to a load 17 are taken from secondary winding 9.

FIGS. 3(a) and 3(b) are of a flux switch alternator. These sketches show the rotor 5′ in two positions. Stator 40 includes a pair of permanent magnets 41 and 42 and a flux guiding structure 43 having pole pieces 44-1, 44-2, 44-3 and 44-4 and windings 45 and 46 on legs 47 and 48. The flux reversal through the AC windings 45 and 46 is demonstrated by rotation of rotor 5′. Also it can be seen that two rotations of rotor 5′ will produce four sine waves. To get 60 cycles (hertz) per second out, rotor 5′ is rotated at 1800 revolutions per minute (RPM) with a double lobed rotor. Using a six lobed rotor 5″, as illustrated in FIG. 5, the speed of rotation can be reduced to 600 RPM for 60 cycle (Hz) AC out. Similar strategies can be used to generate three phase AC. Since rotors 5′ turn with a conservative force, it is obvious it should be embedded in magnetically transparent material MT to make it a better flywheel and a smooth surface to reduce windage losses. In FIGS. 2 and 3(a) and 3(b), a separate drive means coupled to the shafts S of rotors 13, 5 and 5′ produce the motive force on the rotors.

In FIG. 4, stator 70 exemplarily includes four poles 71-1N, 71-2S, 71-3S and 71-4N and connecting sections 72-1, 72-2, 72-3 and 72-4 on which are located the DC coils 75 and the AC output coils 74, AC output coils 74-1 and 74-3 being wound on stator connecting portions 72-1 and 72-3, respectively, and DC coils or windings 75-2 and 75-4 being wound on stator connecting portions 72-2 and 72-4, respectively. These DC windings on the stator connecting portions are energized from a DC source, such as a battery. Prior art solid-state commutator controls such as shown in U.S. Pat. No. 3,569,804 or other DC brushless motor controls may be used when the DC motor coils are on the legs or pole pieces 1, 2, 3 and 4 as in FIG. 6. The rotor 80 is on shaft 81 journeled at it's ends for free rotation, or if vertically oriented, on magnetic bearings to eliminate further friction losses. DC windings 75 and the AC output windings 74 can overlap, and in fact be bifilar wound. As noted above, well established mechanical or solid state commutator technology allows the pulsing or energizing of the motor coils (whether stationary on the stator legs as shown in FIG. 6 or on the rotor as shown in FIG. 4) to selectively provide given magnetic polarities when the rotor gets within 30 degrees of any leg in the direction of motion of the rotor and to deenergize these pulses 10 degrees or so before the rotor gets to a leg. For example, as shown in FIG. 4, brushes B1 and B2 are engaged by commutator segments C1 and C2, respectively, when the rotor is within 30 degrees of leg 2 and 4 of the stator 82 and leave these commutator segments at about 10 degrees before the rotor gets to those legs.

Exemplary dimensions of the four legged stator 70 are 12 inches in diameter by one inch thick and wide, as are the pole pieces 71.

A battery 90 is shown for bias in FIG. 4 however, a positive lead to a DC coil can be attached to the stator in the case where permanent magnets are not used instead of the DC coils.

It will be appreciated that not only does some of the power to the motor coils 82 feed through to the AC output coils 74-1 and 74-3 but the only power required to the motor coils 82 would be that needed in a structure corresponding to FIG. 1 to keep the ball at a constant excursion or the rotor 80 at a constant speed. Also since the power to the DC coils 75-2 and 75-4 saturates the stator 70 when the rotor is between two legs (71-1N and 71-3S or 71-2S and 72-4N) much less motor power is required (as in a variable flux path magnetic amplifier) using a mechanical commutator and winding the DC motor coils 82 on rotor 80. Very little change is required to the input torque as the electrical load on the alternator varies. Magnetic lines of force always tend to shorten their path so they not only take the easiest path, they make the shortest magnetic path. See FIG. 1.

As noted above, the direction of the current fed to the motor coils can be controlled by a mechanical commutator to give the tips of the rotor the opposite magnetic polarity to that of the legs the rotor tips approach.

As shown in FIG. 6, instead of placing the DC motor windings on the rotor as shown in FIG. 5, the motor windings 82 can be on the pole pieces, such as 71-1N of FIG. 6.

By unitizing we not only get rid of an external motor but some of the pulsed power fed to the motor coils will feed through to the AC coils and generate more output. Pulse or energize the motor coils to increase given magnetic polarities when the rotor gets within 30 degrees or so of any leg in the direction of motion and deenergize 10 degrees before 80 gets to a leg to take advantage of a large collapsing field.

Stator losses are caused by current flow either hysteresis or eddy current damping. By biasing stator at a positive voltage most free or conduction electrons are grounded reducing these losses to almost zero. The stator are similar to the electron starved plate of a charged condensor. Biasing works better than laminated or powdered stator to reduce these losses in conductors.

Except for space applications it is more efficient to use brushes and wind the motor coils on the rotor. Since the DC coils should saturate the armature when the rotor is between two legs it takes much more energy to motor coils on the legs compared to rotor.

Motor windings can be applied to the flux switch alternator of FIG. 3a and FIG. 3b incorporating the permanent magnets.

While illustrative forms of the system in accordance with the present invention have been described, it will be understood that numerous changes may be made without departing from the principles and scope of this invention.

What is claimed:

1. A unitized motor alternator for generating alternating current energy comprising in combination,
a flux switch alternator having an stator with a plurality of pole pieces therein, AC output windings on said stator, a rotor having a high magnetic permeability and low magnetic retentivity,
motor winding means on said stator,
means for energizing said motor winding means to apply a conservative force to said rotor of said flux switch alternator and simultaneously induce AC voltage in said AC output windings and,
means for coupling a load to said AC output windings.

2. The invention defidned in claim 1 wherein said motor windings are coupled to a source of direct current and means for controlling current flow from said source of direct current to said motor windings whereby the speed of rotation of said rotor is controlled to thereby control the generation of AC thereby.

3. The invention defined in claim 1 wherein said stator includes permanent magnet means therein.

4. The invention defined in claim 1 wherein said stator includes DC magnetizing coils, and DC motor coils and said AC output windings.

5. The unitized motor alternator for generating alternating current energy as defined in claim 1 wherein said means for energizing said motor windings to apply said conversative magnetic force to said rotor includes means for energizing said winding when said rotor gets to within 30 degrees of the leg and to deenergize said winding within about 10 degrees of said leg.

6. In an apparatus for converting direct current electrical energy to alternating current electrical energy, including, a flux switch alternator having an stator structure and AC output windings on said stator structure, a rotor having a high magnetic permeability and low magnetic retentivity, the improvement comprising,
DC motor winding means on said stator,
means for energizing said motor winding to apply a conservative magnetic force to drive said rotor and simultaneously induce alternating current in said AC output windings.

7. Apparatus as defined in claim 6 including means for controlling current flow from the source of direct current to said motor winding whereby the speed of rotation of said rotor is controlled to thereby control generation of AC energy in said output windings.

8. Apparatus as defined in claim 6 wherein said rotor has a plurality of lobes thereon and said stator has corresponding legs, and said means for energizing said motor winding to apply said conservative magnetic force to said rotor includes means for energizing said motor winding when a predetermined lobe of said rotor gets to within about 30 degrees of a leg of said stator and to deenergize said motor winding within about 10 degrees of the same said leg.

* * * * *